J. HARTNESS.
WASHBASIN.
APPLICATION FILED APR. 18, 1907.
971,839.
Patented Oct. 4, 1910.
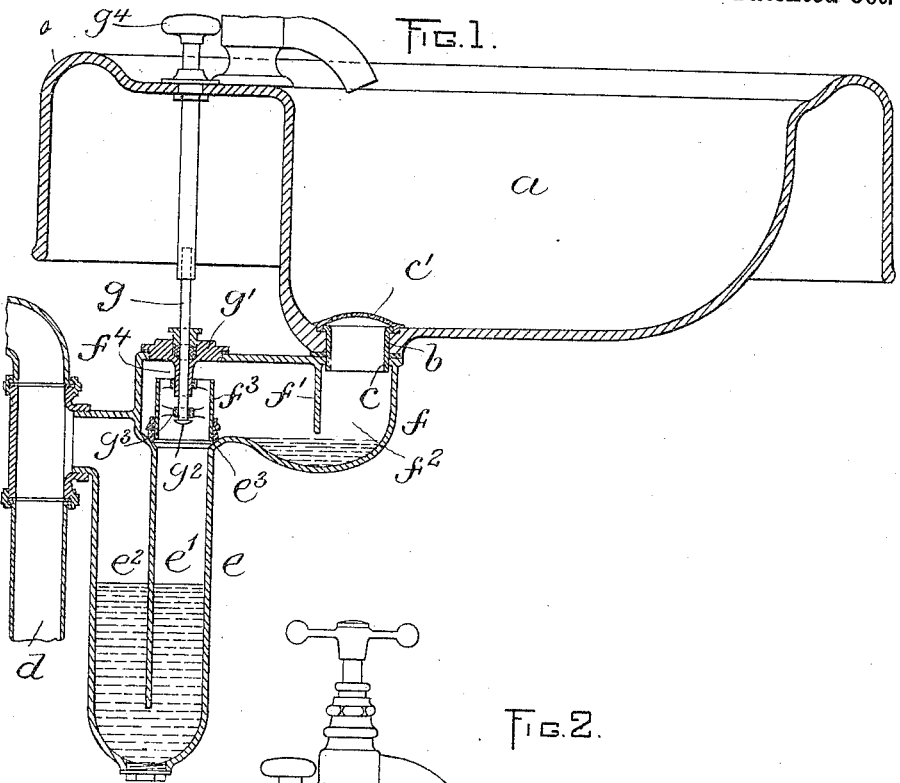
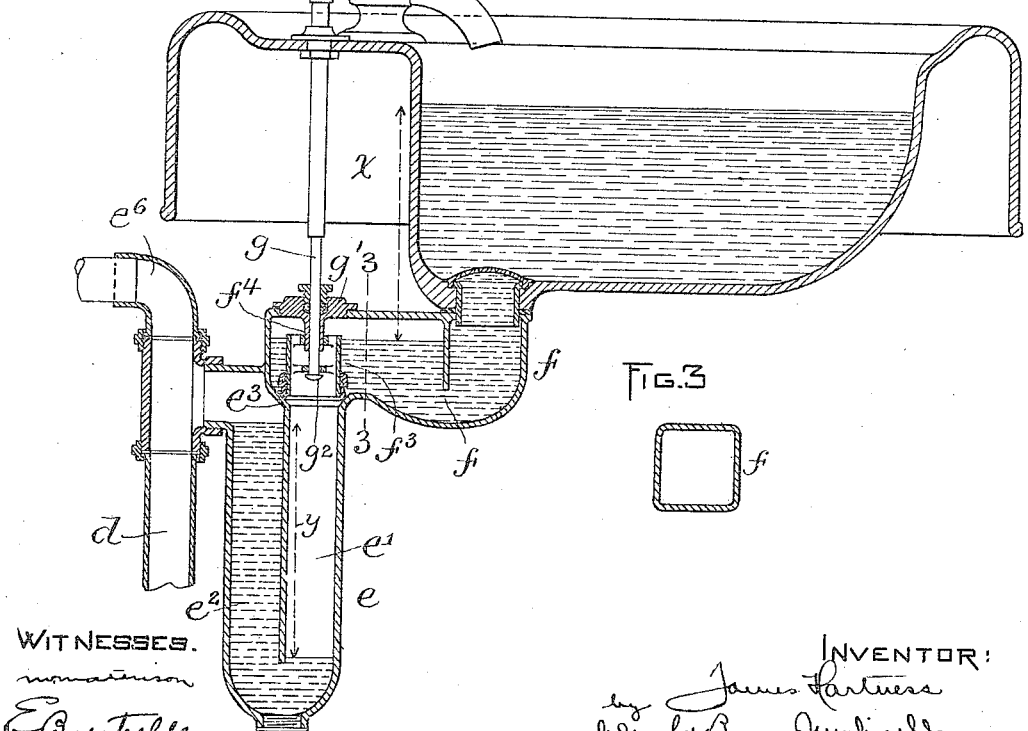
WITNESSES.
INVENTOR:
James Hartness
by Wright Brown Quinby Bay
Attys.

UNITED STATES PATENT OFFICE.

JAMES HARTNESS, OF SPRINGFIELD, VERMONT.

WASHBASIN.

971,839.  Specification of Letters Patent.  Patented Oct. 4, 1910.

Application filed April 18, 1907. Serial No. 368,866.

*To all whom it may concern:*

Be it known that I, JAMES HARTNESS, of Springfield, in the county of Windsor and State of Vermont, have invented certain new and useful Improvements in Washbasins, of which the following is a specification.

This invention has for its object to obviate the use of overflow conduits or ducts which have heretofore been employed in wash basins, sinks, bath tubs and the like, and at the same time to provide for an outflow of the contents of the bowl when the water reaches a predetermined level therein. It is well known to bacteriologists and sanitarians that such overflow conduits or ducts afford lodgment for germs and microbes and are generally foul with waste material.

According to my present invention, I dispense with the overflow conduits and ducts and provide but a single outlet through which the water must pass when it is discharged, and through which the water will pass when it reaches a predetermined level or height in the bowl, all without any additional opening for the discharge into the atmosphere of the foul air contained in the dead end between the trap and the bowl.

The principle, upon which the invention operates, is that of balancing a column of trapped air between two columns of water, one in the trap and one in the bowl so that, when the column of water (in the bowl) on one side of the air column is sufficient to force the column of air downward and lift the other column of water (in the trap), the water in the bowl will be discharged.

The invention consists, therefore, of a primary or permanent trap adapted to hold a column of water of an altitude substantially equal to the maximum altitude of the water in the bowl, and an intermediate drainable trap which comprises an air chamber adapted to contain a column of air equal to or not less than the column of water in the inlet limb of the permanent trap. The intermediate trap, as stated, is drainable, this being accomplished by the employment of a movable trap member which may be the discharge limb of said trap, and which will be dislocatable or movable so as to allow the contents of the said trap to drain out. For economy in space and for maximum efficiency, the intermediate trap is shallow and is located below the horizontal plane of the bottom of the bowl, both traps being exterior of the bowl.

Referring to the accompanying drawings, Figure 1 represents in section a wash basin embodying the invention, the water being shown at the normal level in the permanent trap. Fig. 2 represents a similar view and shows the water at its various levels in the bowl, the permanent trap and the intermediate trap at about the same time when the water will be discharged from the bowl. Fig. 3 represents a vertical transverse section through the intermediate trap.

On the drawings, the bowl is indicated at $a$, its discharge port is indicated at $b$, and it is formed with a downwardly extending thimble $c$, the upper part of which is provided with a strainer $c'$. $d$ indicates the house connection or soil pipe, between which and the bowl an outlet device comprising my invention is interposed. The said device comprises a permanent trap $e$ and an intermediate drainable trap $f$. The permanent trap $e$ is U-shaped, its inner and outer or inlet and discharge limbs being indicated at $e'$ $e^2$ respectively. The length of the limb $e^2$ determines the height of the column of water in the bowl, as will be explained. The intermediate drainable trap $f$ consists of a closed casing in which there is an air chamber whose volume is not less than the volume in the inlet limb $e'$ of the permanent trap. This casing is elongated and is arranged horizontally, being placed below the plane of the bottom of the bowl. Into the inner end of said casing projects the dependent thimble $c$ there being a web or partition $f'$ which forms the inlet limb $f^2$ of the intermediate trap. Located in the chamber is a stand-pipe or movable trap member $f^3$ arranged above the inlet limb $e'$ of the permanent trap $e$, and forming the outlet limb of the intermediate trap. It is adapted to be dislocated for the purpose of draining the intermediate trap and to this end it is conveniently formed to be seated in a valve seat $e^3$ at the upper end of the limb $e'$. It is guided by a guide $f^4$ which holds it against lateral movement. When the stand-pipe or discharge limb $f^3$ of the intermediate trap is on its seat, as shown in Fig. 1, the intermediate trap is operative as such. The rod $g$ extends upwardly through a cap $g'$ screwed into an opening in the upper wall of the trap, and on its lower end it has a head $g^2$ by which it may be engaged with a spider $g^3$ secured to the upper end of the standpipe or limb $f^3$. The upper end of the rod $g$ extends through the upper surface $a'$ of the basin, and is provided with a handle $g^4$ by which it may be raised so as to lift the limb $f^3$ and permit the intermediate trap to drain.

The operation is as follows: Assuming that there is water in the permanent trap, as indicated in Fig. 1, and that water is being admitted to the bowl, the discharge of the water from the bowl will, as soon as the level of the water in the intermediate trap is above the lower end of the inlet limb $f^2$ thereof, trap air in said intermediate trap. As the water continues to flow from the bowl, the air in the air chamber in the intermediate trap will be forced by the incoming water outward and downward through the limbs $f^3$ and $e'$. This will continue until there is in the primary trap a column of water in the limb $e^2$ balanced by the column of air in the limb $e'$. The level of the water in the intermediate trap has in the meantime been raised, and the height of the column of water in the bowl above the level of the water in the intermediate trap will be equal to the height of the column of water in the limb $e^2$ measuring from the level of the water in the limb $e'$ of said permanent trap. The height of the water column in the bowl is measured from the level of the water in the secondary trap (see dotted line X Fig. 2), and is equal to the distance between the water levels in the inlet and outlet limbs of the permanent trap (see dotted line Y same figure). By reference to Fig. 2, it will be seen that the levels of the water are at their maximum heights. If the water is being admitted to the bowl slowly, the column of water in the bowl will remain at the height indicated, and the additional water admitted to the intermediate trap will flow down through the movable trap member $f^3$ to the inlet limb of the permanent trap without upsetting the balance. But, if the water is admitted to the bowl so rapidly that the water flowing through the limb $e'$ carries out sufficient air contained therein to destroy the balance, then the entire contents of the bowl will be discharged. Ordinarily the contents of the bowl will be discharged by dislocating the movable member of the intermediate trap, i. e. by lifting the rod $g$ so as to raise the limb or standpipe $f^3$, so that the water may flow from the intermediate trap directly into the open end of the limb $e'$ of the permanent trap. The rod is maintained in its raised position until the water is discharged from the intermediate trap, and the latter has received a full air supply. Any of the ordinary means may be utilized for holding the rod $g$ in its raised position.

It may be pointed out that it is essential that the air chamber in the intermediate trap should normally, when the basin is not in use, have its proper air supply, which may be trapped when the basin is next used, so as to afford the volume of air necessary to counterbalance the column of water in the permanent trap and the column of water in the bowl, and moreover, that this air may be admitted to the inlet end of the permanent trap. If air were not admitted to the intermediate trap after the bowl had been flushed, there would not be present in the trap sufficient air to balance the column of water in the discharge limb $e^2$ of the permanent trap and cause the water to rise in the bowl. The permanent trap is provided with the usual air vent $e^6$. It is quite apparent that the invention is not limited to the particular details of construction which I have illustrated and described, since various changes may be made in the discharge device without departing from the spirit and scope of the invention.

Having thus explained the nature of my said invention, and described a way of constructing and using the same, although without attempting to set forth all of the forms in which it may be made or all of the modes of its use, I declare that what I claim is:

1. The combination with a bowl, and a permanent trap whose limbs are not less in altitude than the desired maximum water column in the bowl, of an intermediate drainable trap having an air chamber whose volume is not less than the volume of the inlet limb of the permanent trap, said trap comprising a fixed air containing chamber, and a displaceable trap member movable relatively to said chamber.

2. The combination with a bowl, and a permanent trap whose limbs are not less in altitude than the desired maximum water column in the bowl, of an intermediate trap located below the horizontal plane of the bottom of the bowl and having a fixed air chamber whose volume is not less than the volume of the inlet limb of the permanent trap, and means movable relatively to said chamber, permitting the drainage of said intermediate trap.

3. The combination with a bowl, and a permanent trap whose limbs are not less in altitude than the desired maximum water column in the bowl, of an intermediate trap having a fixed air chamber communicating with the inlet limb of the permanent trap to balance a column of water of maximum height in the outlet limb of said permanent trap; and also having a manually controlled trap member movable relatively to said chamber for permitting the drainage of said intermediate trap, and through which the overflow discharge takes place when the water rises above the maximum level in the bowl.

4. The combination with a bowl, and a permanent trap whose limbs are not less in altitude than the desired maximum water column in the bowl, of an intermediate trap arranged below the horizontal plane of the bottom of the bowl and having inlet and outlet limbs and an immovable air chamber of sufficient volume, in consequence of which air will be trapped therein, substantially for the purpose set forth, and means for dislocating said outlet limb relatively to the walls of said chamber to permit the escape of substantially all liquid from said air chamber.

5. The combination with a bowl and a permanent trap, of an intermediate trap, consisting of a fixed closed casing having oppositely extending separated limbs, one communicating with the bowl and the other with the inlet limb of the permanent trap, and means for dislocating said second-mentioned limb of said intermediate trap to permit the escape of water from said trap.

In testimony whereof I have affixed my signature, in presence of two witnesses.

JAMES HARTNESS.

Witnesses:
J. W. BENNETT,
MARCUS B. MAY.